US006188559B1

(12) United States Patent
Vincent et al.

(10) Patent No.: US 6,188,559 B1
(45) Date of Patent: Feb. 13, 2001

(54) LINE-PROTECTION DEVICE WITH INTEGRATED CUTOFF

(75) Inventors: Alain Vincent, Juilly; François Michaux, Saint Menges, both of (FR)

(73) Assignee: Alcatel, Paris (FR)

( * ) Notice: Under 35 U.S.C. 154(b), the term of this patent shall be extended for 0 days.

(21) Appl. No.: 09/317,219

(22) Filed: May 24, 1999

(30) Foreign Application Priority Data

Jun. 4, 1998 (FR) .................................................. 98 07008

(51) Int. Cl.[7] ....................................................... H02H 3/22
(52) U.S. Cl. .......................... 361/117; 361/124; 361/103
(58) Field of Search .................................... 361/103, 104, 361/117, 124

(56) References Cited

U.S. PATENT DOCUMENTS 4,876,626 * 10/1989 Kaczmarek .......................... 361/119
4,901,188 * 2/1990 Gilberts ................................ 361/119

FOREIGN PATENT DOCUMENTS 2 560 458 A1 8/1985 (FR) .
2 659 504 A1 9/1991 (FR) .

* cited by examiner

*Primary Examiner*—Josie Ballato
*Assistant Examiner*—Robert L. DeBeradinis
(74) *Attorney, Agent, or Firm*—Sughrue, Mion, Zinn, Macpeak & Seas, PLLC

(57) ABSTRACT

The device comprises a three-pole lightning arrester, switch means having conductive blades, trigger means having a trigger fuse piece which is thermally connected to the lightning arrester, and conductor means which define input and output line terminals and a ground terminal. The conductor means provide links between the input terminals and the output terminals, between the line electrodes of the lightning arrester and the input terminals, and between a ground electrode of the lightning arrester and the ground terminal. The trigger piece maintains the blades in their first position until a heating limit temperature above which the piece melts and enables the blades to be resiliently returned to their second position. The trigger piece is made up of a recessed central body bearing against the lightning arrester, and of blade-retaining members positioned on either side of the central body so as to secure the blades to the trigger piece.

8 Claims, 2 Drawing Sheets

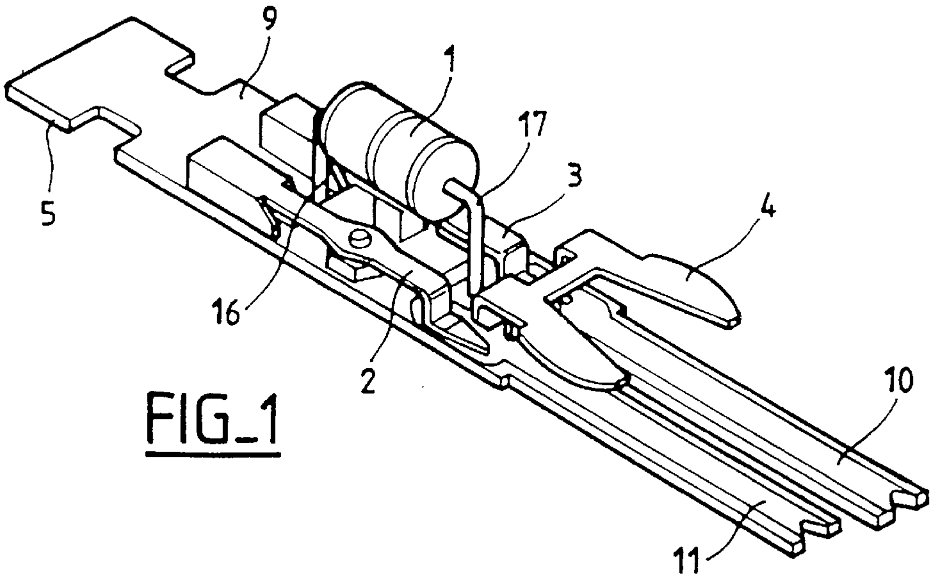
FIG_1
FIG_2
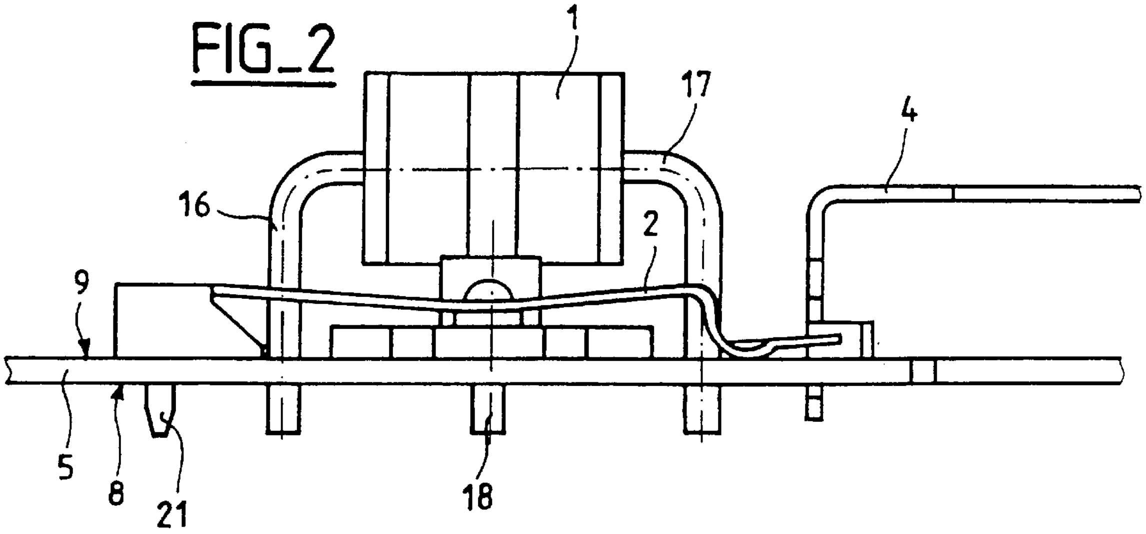
FIG_3
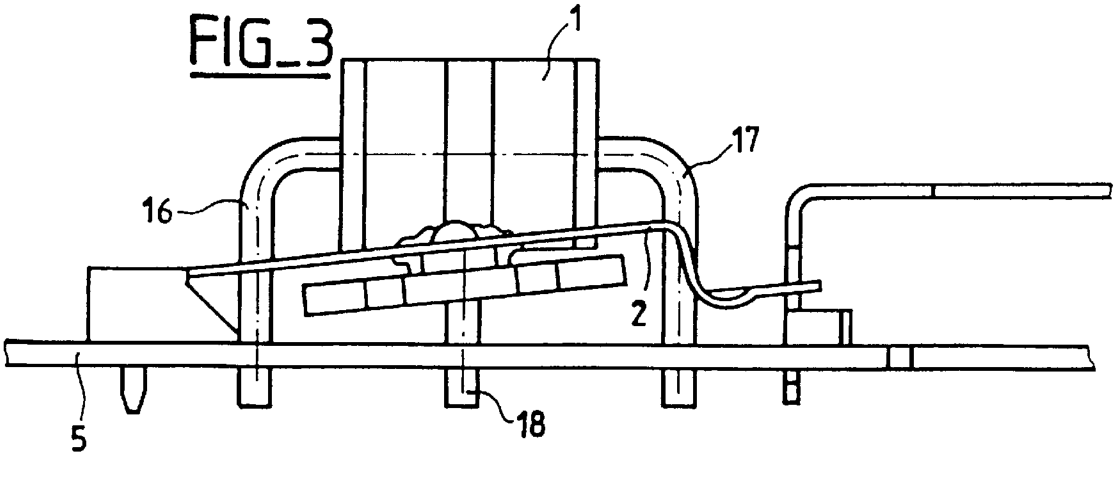

FIG_4
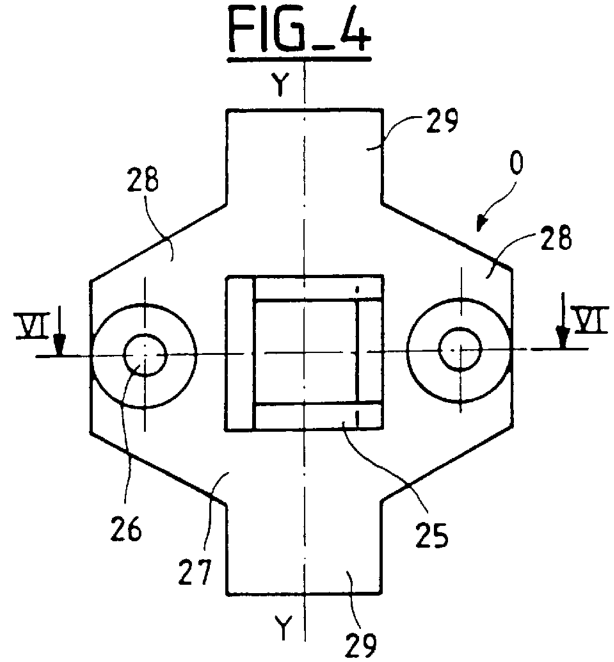
FIG_5
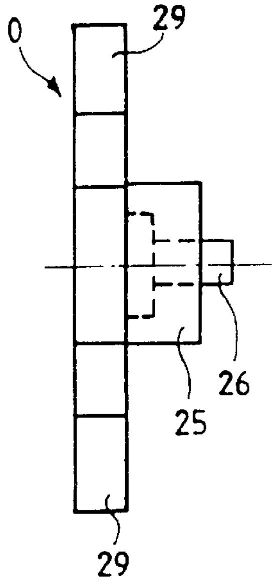
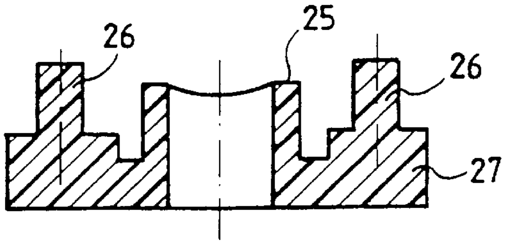
FIG_6
FIG_7
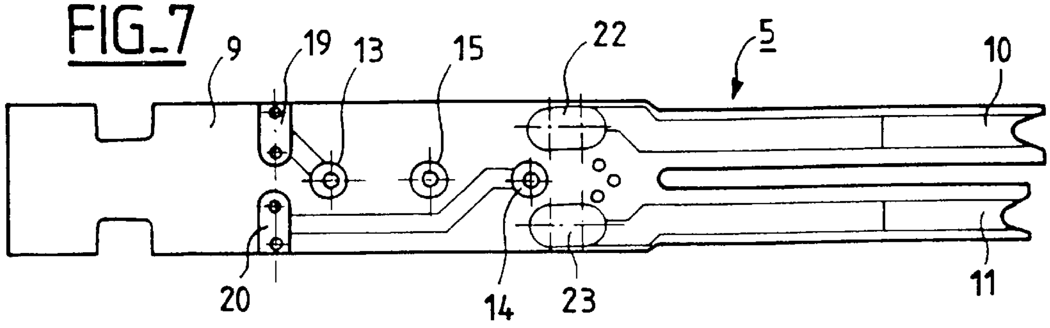
FIG_8
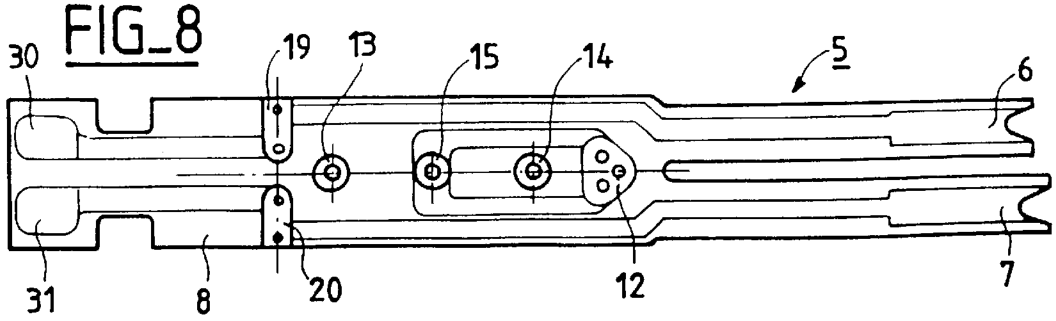

LINE-PROTECTION DEVICE WITH INTEGRATED CUTOFF

The invention relates to a line-protection device of the type referred to as having "integrated cutoff", serving to protect equipment connected to a low-current line in the event that an electrical fault occurs on the line, as is conventional in telecommunications systems.

BACKGROUND OF THE INVENTION

Such devices are commonly used at cable heads or at telephone distribution frames, in particular for protecting user telephone sets against any voltage surges that might be transmitted by the transmission links that enable the sets to be connected to remote centralizing telecommunications equipment. Such protection is achieved conventionally by interrupting electrical continuity along the two wires of a link, and by grounding the wires in the device, when said device is active.

Document FR-A-2560458 describes a protection device triggered by a lightning arrester overheating. A grounding spring is maintained cocked and not in contact by an insulating fuse pellet. The lightning arrester being heated to above a determined temperature value causes the pellet to melt, at least partially, and causes the spring to perform grounding. Unfortunately, because of the structure of the device, and in particular because of the position of the pellet relative to the lightning arrester that controls it, it is not possible to obtain a response that is as quick and reliable as is necessary.

Document FR-A-2659204 describes a protection device which is also triggered by a pellet melting due to a lightning arrester overheating. However, in that case, the pellet is in direct thermal contact with the lightning arrester, which makes it possible for the response speed characteristics of the device to be better controlled. Unfortunately, as indicated in that document, it is possible, under certain conditions, for the pellet to be softened only, and the response of the device is then not necessarily identical to that obtained when the lightning arrester overheating leads to total and rapid melting.

OBJECTS AND SUMMARY OF THE INVENTION

The invention thus proposes an integrated-cutoff protection device that is of simple structure, and that offers high reliability and high speeds of response, in particular under lower limit conditions for the triggering voltage.

The protection device of the invention comprises:

a three-pole lightning arrester provided with two line electrodes and one ground electrode;

conductor means which define two line input terminals, two line output terminals, and a ground terminal, and which provide respective links between the line electrodes of the lightning arrester and respective ones of the input terminals, between the ground electrode of the lightning arrester and the ground terminal, and between the line input terminals and the line output terminals;

switch means having conductive blades in which each blade connects one of the input terminals to a respective one of the output terminals when it is in a first position, and is resiliently returned against a grounding piece connected to the ground terminal when it is in a second position, whereupon it interrupts the link hitherto established between an input terminal and an output terminal; and trigger means comprising a trigger fuse piece which is thermally connected to the lightning arrester and which maintains the blades in their first position until a heating limit temperature is reached above which the piece melts and enables the blades to be resiliently returned to their second position;

wherein the trigger means are constituted by a trigger piece which is made up of a recessed central body bearing against the lightning arrester, and of blade-retaining members positioned on either side of the central body so as to secure said trigger piece to each of the blades.

BRIEF DESCRIPTION OF THE DRAWINGS

The invention, its characteristics, and its advantages are made clearer in the following description given with reference to the figures listed below:

FIG. 1 is a perspective view of a line-protection device of the invention;

FIGS. 2 and 3 are side views of the device of the invention, respectively prior to fuse triggering and after fuse triggering;

FIGS. 4, 5, and 6 are respectively a plan view, a left view, and a section view on VI—VI of a triggering fuse piece of the invention; and FIGS. 7 and 8 are respectively a plan view and an underneath view of a printed circuit card for a device of the invention.

MORE DETAILED DESCRIPTION

The integrated-cutoff line-protection device of the invention as shown in the figures comprises a cylindrical three-pole lightning arrester 1, switch means comprising flexible conductive blades 2, 3, a conductive grounding piece 4, and triggering means operating by means of a fuse piece 0 thermally connected to the lightning arrester.

In this example, these components are positioned on a printed circuit element 5 that is elongate in shape, and that is provided with conductive tracks, and conductive connection zones in particular for terminals or contacts, which zones are selectively connected to the tracks to form a set of "conductor means".

The device is designed to be connected to two wires of a low-current line, and in particular of a telephone line, at the transmission cable or at the distribution frame, via two input line terminals 6 and 7. In this example, the input terminals are implemented at a first end of the element 5 and on a face 8 that is opposite from the face referenced 9 on which the lightning arrester 1 is mounted.

The device is also designed to be connected to wires serving subscriber equipment or a subscriber telephone set (not shown) via two output line terminals 10 and 11 which are connected to the input terminals 6, 7 via flexible conductive blades 2, 3 when said blades are forced into a first position. In this example, the output terminals 10 and 11 are implemented on face 9 at a second end of the element 5.

An interconnection terminal 12 is provided on the element 5 for receiving the grounding piece 4. In this example, the interconnection terminal is provided with three holes disposed triangularly on face 9 of the element 5 so as to receive three connection rods provided on the grounding piece. The grounding piece is connected to a grounding link external to the element 5 in a manner known per se and not explained in detail herein insofar as it is not directly related to the invention.

Interconnection terminals 13, 14, 15 are provided on the element 5. In this example, they are constituted by conductive zones formed at holes enabling the connection rods of the two line electrodes 16, 17 and of the central ground electrode 18 of the lightning arrester 1 to be positioned and electrically connected. In this example, interconnection terminals 19 and 20 analogous to the above-mentioned interconnection terminals are provided to make it possible to position and to connect electrically the connection rods on each of the conductive blades 2, 3 at that end of each blade which is fixed to the element 5, such as rod 21 for conductive blade 2 in FIG. 2.

Terminals 22, 23 are constituted, in this example, by conductive abutment zones carried by the element 5 at positions enabling each of them to receive a moving contact end of a respective one of the flexible conductive blades 2, 3. In this example, these terminals are implemented on face 9 of the element 5 on either side of the lightning arrester 1 and of the longitudinal axis of the element 5, parallel to which the lightning arrester is mounted. Links, via conductive track, metal-plated through holes and/or conductive rods, make it possible to set up the necessary electrical continuity, and in particular the electrical continuity between the interconnection terminals 13, 14, and 15 provided for the connection rods of the lightning arrester and the terminals 19, 20, and 12 respectively, the electrical continuity between the input terminals 6 and 7 and the interconnection terminals 19 and 20 respectively, and the electrical continuity between the output terminals 10 and 11 and the terminals 22 and 23 respectively.

Contact zones 30 and 31 connected to the terminals 19, 20 make it possible to perform a line test when the device is in place.

The flexible conductive blade switch means are organized such that each of the blades 2, 3 maintains an electrical link between one of the input terminals 6, 7 and one of the output terminals 10, 11 so long as the lightning arrester 1 does not need to perform its function. The blades 2, 3 are forced into abutment against the terminals 22, 23 by the trigger fuse piece 0 which counteracts the resilient return force that urges the moving end of each flexible blade away from the terminal against which said end is pressed.

The trigger fuse piece 0 is a rigid piece made of a plastics material whose state changes at a low temperature of about 100° C.

This piece must have good rigidity in order to withstand the resilient return forces produced by the flexible blades when they are in their first position. It must also enable the blades to go as quickly as possible from their first position, in contact with the terminals 22, 23, to their second position, in contact with the grounding piece 4, when the temperature caused by the lightning arrester overheating corresponds to the change temperature or melting point of the material of the trigger piece 0. To this end, it is desirable to minimize both the quantity of material whose state is to be changed and also the time required to trigger the device by means of the blades going from their first position to their second position, when the lightning arrester overheats, and to do so without reducing the rigidity necessary to maintain the blades in their first position before the device is triggered.

To this end, the trigger piece includes a central body 25 designed to come into abutment via one end against a portion of side wall of the lightning arrester 1, so as to be in direct thermal contact therewith. It also includes blade-retaining members 26 positioned on either side of the central body so as to maintain the moving ends of the blades 2, 3 at a distance from the grounding piece, and in contact with the terminals 22, 23.

In the embodiment shown, the central body 25 projects from a base 27 situated opposite from the end via which the body comes into abutment against the lightning arrester 1.

In general, the central body of a device of the invention includes at least one central recess serving to limit the quantity of material used to make it, for the above-indicated reason. The dimensions of the body are computed to provide the essential rigidity while minimizing both the material to be removed when the device is triggered, and also the triggering time.

In a preferred embodiment of the invention, the central body has a cross-section whose dimensions are small compared with those of the cross-section of the lightning arrester. It is tubular in shape, and it is open at both of its ends, a square shape having been chosen for the cross-section of the tube formed by the central body 25 shown in FIGS. 4 to 6.

In this example, the base 27 has a flat bottom so that it can come into position against the face 9 of the element 5, and it carries retaining members 26 which are organized to project from two support elements 28 with which the base is provided symmetrically on either side of the central body 25.

Stabilizer extensions 29 to the base 27 are disposed between the retaining member support elements. In the embodiment shown, two stabilizer extensions 29 are disposed symmetrically on either side of the central body 25. They are in alignment on an axis YY perpendicular to an axis XX on which the support elements 28 are aligned, the axis YY being aligned with the longitudinal axis of the element 5 on which the trigger piece 0 is placed, when said piece is in place in the device.

In the embodiment shown, the two blades 2, 3 are secured to the trigger piece 0 by riveting, and the retaining members 26 are rivets projecting from the support elements 28, with which they are molded. The rivets penetrate into holes provided in central portions of the blades 2, 3 which are secured to the trigger piece and therefore to each other by the rivets after a riveting operation has been performed. In another embodiment (not shown), the retaining members are constituted by snap-fastening catches positioned on the trigger piece support elements so as to clamp the blades in their respective middle portions, using a method well known to the person skilled in the art, thereby securing them to each other as indicated above. Naturally, other common securing means may be used instead of those in the above-mentioned embodiments.

In the embodiment shown in FIG. 2, the device is provided with two blades 2, 3 which are disposed longitudinally on either side of the three-pole fuse 1. The blades 2, 3 have their respective stationary ends connected to respective ones of two interconnection terminals 19, 20 of the element 5 to which they are fixed.

One end of the body 25 of the trigger piece comes into contact with the lightning arrester 1 over part of a central portion thereof that is constituted by the periphery of the ground electrode of the lightning arrester. A concave recess is provided in said end to enable the body 25 to be in good abutment against the cylindrical wall of the lightning arrester, and therefore to enable good thermal conduction to be obtained. In the embodiment shown, the duct passing longitudinally through the main body of the trigger piece receives the connection rod 18 of the central ground electrode of the lightning arrester. This makes it possible for the is trigger piece 0 to be positioned accurately relative to the lightning arrester 1 on the element 5. Before its shape is changed or before it melts as a result of the lightning arrester 1 overheating, the trigger piece 0 maintains the free ends of the blades 2 and 3 in abutment against the terminals 22 and 23 and at a distance from the grounding piece 4, because the central body 25 abuts against the lightning arrester, as shown in FIG. 2. The lightning arrester being heated to above the change temperature or the melting point chosen for the trigger piece causes the central body 25 to be heated by contact thermal conduction. The central body thus starts melting from its end in contact with the lightning arrester 1.

Since a tubular shape is chosen for the central body, and because its cross-section is small compared with the cross-section of the lightning arrester, heat is transmitted from the lightning arrester 1 to the trigger piece 0 via a small volume of material, and thus with little inertia. The central body thus melts rapidly first, before the base and as soon the heating limit temperature of the material of the trigger piece is reached. The device is thus triggered as soon as the central body 25 changes or melts. The return resilient forces of the blades 2, 3 then move the blades away from the terminals 22, 23 and cause the input terminals 6 and 7 to be grounded, as shown in FIG. 3. This grounding is performed by the blades 2, 3 coming into contact with the grounding piece 4 at the end of the resilient return stroke, when the moving ends of the blades reach their second determined position.

The time taken for the central body to change or to melt may be very short. It can be determined with great accuracy, when a small quantity of material is involved in forming the central body, as is the case in this example. High operating reliability is thus obtained, because the quantity of material that needs to be melted or softened to obtain triggering is small. Under these conditions, the central body no longer constitutes an obstacle to triggering, in particular if a rigid tubular structure having a thin wall and a small cross-section is chosen for the central body.

The dimensioning that is set for the central body and the material that is chosen are then essential factors which make it possible to influence simply the operating characteristics of the device of the invention, as a function of real needs.

What is claimed is:

1. A line-protection device with integrated cutoff, the device comprising:

a three-pole lightning arrester provided with two line electrodes and one ground electrode;

conductor means which define two line input terminals, two line output terminals, and a ground terminal, and which provide respective links between interconnection terminals of the line electrodes of the lightning arrester and respective ones of the input terminals, between an interconnection terminal of the ground electrode of the lightning arrester and the ground terminal, and between the line input terminals and the line output terminals;

switch means having conductive blades in which each blade connects one of the input terminals to a respective one of the output terminals when it is in a first position, and is resiliently returned against a grounding piece connected to the ground terminal when it is in a second position, whereupon it interrupts the link hitherto established between an input terminal and an output terminal; and trigger means comprising a trigger fuse piece which is thermally connected to the lightning arrester and which maintains the blades in their first position until a heating limit temperature is reached above which the piece is transformed and enables the blades to be resiliently returned to their second position;

wherein the trigger means are constituted by a trigger piece which is made up of a recessed central body bearing against the lightning arrester, and of blade-retaining members positioned on either side of the central body so as to secure the blades to the trigger piece.

2. A device according to claim 1, wherein the trigger piece includes a hollow tubular central body whose cross-section is small compared with the cross-section of the lightning arrester against the side wall of which it abuts.

3. A device according to claim 1, wherein the connection rod of the ground electrode of the lightning arrester passes through the central body of the trigger piece.

4. A device according to claim 1, wherein the trigger piece includes a central body provided with a wider, flat-bottomed base on which the blade-retaining members are positioned, the base being situated opposite from the end of the central body that is designed to come into abutment against a lightning arrester.

5. A device according to claim 4, wherein the trigger piece includes a base which carries two retaining member support elements extending the base on either side of the central body, and piece-stabilizing extensions disposed on either side of the base between the retaining member support elements.

6. A device according to claim 1, wherein the blade-retaining members are constituted by rivets whose respective bodies are part of the trigger piece.

7. A device according to claim 1, wherein the blade-retaining means are constituted by snap-fastening catches which are part of the trigger piece.

8. A device according to claim 1, including conductor means provided on a printed circuit element that is elongate in shape, and that has a central portion in which the interconnection terminal holes for the three-pole lightning arrester are provided, and around which the longitudinally-extending conductive tracks of the links, in particular between the line input terminals and the line output terminals, are distributed, as are the conductive contact zones for the moving ends of the conductive blades of the switch means, and wherein the blades, as fixed at one end and positioned on either side along the lightning arrester, are maintained in said first position with their respective free ends separated from the grounding piece carried by the printed circuit card, under the action of the trigger piece which has its retaining members individually fixed to said blades in middle zones between their ends, said trigger piece abutting firstly against a portion of the periphery of the ground electrode of the lightning arrester, and secondly against the card, so long as the heating limit temperature is not reached.

* * * * *